US011168984B2

(12) United States Patent
Li et al.

(10) Patent No.: US 11,168,984 B2
(45) Date of Patent: Nov. 9, 2021

(54) CELESTIAL NAVIGATION SYSTEM AND METHOD

(71) Applicant: The Boeing Company, Chicago, IL (US)

(72) Inventors: Rongsheng Li, Hacienda Heights, CA (US); Tung-Ching Tsao, Torrance, CA (US); Harold A. Klotz, Jr., East Carondelet, IL (US); Bruce M. Pope, Yorba Linda, CA (US); Paul J. Haug, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 16/271,105

(22) Filed: Feb. 8, 2019

(65) Prior Publication Data
US 2020/0256678 A1    Aug. 13, 2020

(51) Int. Cl.
G01C 21/02    (2006.01)
G01C 21/16    (2006.01)
(Continued)

(52) U.S. Cl.
CPC ......... G01C 21/025 (2013.01); G01C 21/165 (2013.01); G05D 1/101 (2013.01); G06F 16/29 (2019.01)

(58) Field of Classification Search
CPC ..... G01C 21/025; G01C 21/165; G06F 16/29; G05D 1/101
See application file for complete search history.

(56) References Cited

U.S. PATENT DOCUMENTS 3,636,330 A * 1/1972 Holeman ............... G01C 21/00
                                                  701/513
3,769,710 A * 11/1973 Reister ................. G01C 21/165
                                                  33/320
(Continued)

FOREIGN PATENT DOCUMENTS

CN    100430751 C  * 11/2008   ............. G01S 19/25
CN    102540222 A  *  7/2012   ........... G01S 5/0263
(Continued)

OTHER PUBLICATIONS

Three-state Extended Kalman Filter for Mobile Robot Localization, by Evgeni Kiriy & Martin Buehler dated Apr. 12, 2002 (Year: 2002).*
(Continued)

Primary Examiner — Behrang Badii
Assistant Examiner — Jalal C Coduroglu
(74) Attorney, Agent, or Firm — Vivacqua Crane, PLLC

(57) ABSTRACT

A celestial navigation system and method for determining a position of a vehicle. The system includes a star-tracker, a beam director, an inertial measurement unit, and a control module. The star-tracker has a field of view for capturing light. The beam director is configured to change a direction of the light captured in the field of view of the star-tracker. The inertial measurement unit has a plurality of sensors for measuring an acceleration and a rotation rate of the vehicle. The control module executes instructions to correct the attitude, the velocity and the position of the vehicle using the determined magnitude and position of the space objects. The control module also executes instructions to generate corrections to the IMU error parameters, the beam director and star-tracker alignment errors, and RSO ephemeris errors to achieve optimal performance.

24 Claims, 4 Drawing Sheets

(51) Int. Cl.
*G05D 1/10* (2006.01)
*G06F 16/29* (2019.01)

(56) References Cited

U.S. PATENT DOCUMENTS

| | | | | |
|---|---|---|---|---|
| 4,649,549 A * | 3/1987 | Halpern | H04B 1/707 | 375/149 |
| 5,960,097 A * | 9/1999 | Pfeiffer | G06K 9/3241 | 382/103 |
| 6,108,594 A | 8/2000 | Didinsky et al. | | |
| 6,272,432 B1 * | 8/2001 | Li | B64G 1/288 | 701/501 |
| 6,278,945 B1 * | 8/2001 | Lin | G01C 21/165 | 701/472 |
| 6,285,927 B1 * | 9/2001 | Li | G01C 21/025 | 701/13 |
| 6,298,288 B1 * | 10/2001 | Li | B64G 1/288 | 701/13 |
| 6,304,822 B1 * | 10/2001 | Liu | B64G 1/361 | 701/13 |
| 6,330,988 B1 * | 12/2001 | Liu | B64G 1/361 | 244/164 |
| 6,356,815 B1 * | 3/2002 | Wu | B64G 1/361 | 701/13 |
| 6,449,559 B2 * | 9/2002 | Lin | G01C 21/165 | 342/357.31 |
| 6,512,979 B1 | 1/2003 | Needelman et al. | | |
| 6,681,159 B2 | 1/2004 | Li et al. | | |
| 6,691,033 B1 * | 2/2004 | Li | B64G 1/361 | 244/164 |
| 6,766,227 B2 | 7/2004 | Needelman et al. | | |
| 6,799,116 B2 * | 9/2004 | Robbins | G01S 19/072 | 701/469 |
| 6,862,526 B2 * | 3/2005 | Robbins | G01S 19/071 | 701/469 |
| 7,451,022 B1 * | 11/2008 | Luk-Paszyc | G01C 21/165 | 701/13 |
| 7,579,984 B2 * | 8/2009 | Wang | G01C 21/165 | 342/357.59 |
| 8,134,499 B2 * | 3/2012 | Wang | G01C 21/165 | 342/357.3 |
| 8,209,596 B1 * | 6/2012 | Gilmour | G01S 19/02 | 714/819 |
| 8,370,064 B1 * | 2/2013 | Li | G01C 21/165 | 701/479 |
| 8,543,266 B2 | 9/2013 | Li et al. | | |
| 8,842,042 B2 * | 9/2014 | Rideout | G01S 5/06 | 342/357.66 |
| 9,003,880 B2 * | 4/2015 | Sbihli | G01N 29/225 | 73/488 |
| 9,217,643 B1 * | 12/2015 | Belenkii | G01S 5/16 | |
| 9,239,376 B2 * | 1/2016 | Mathews | G01S 11/10 | |
| 9,648,252 B2 * | 5/2017 | Laine | H01J 31/26 | |
| 9,791,278 B2 * | 10/2017 | McCroskey | B64G 1/36 | |
| 9,909,866 B2 * | 3/2018 | Karlov | G01C 1/08 | |
| 10,371,806 B2 * | 8/2019 | Mathews | G01S 11/10 | |
| 2001/0020216 A1 * | 9/2001 | Lin | G01S 19/44 | 701/472 |
| 2002/0125375 A1 | 9/2002 | Wu et al. | | |
| 2002/0198657 A1 * | 12/2002 | Robbins | G01S 19/04 | 701/469 |
| 2004/0204852 A1 * | 10/2004 | Robbins | G01S 19/071 | 701/469 |
| 2005/0071055 A1 | 3/2005 | Needelman et al. | | |
| 2006/0071849 A1 * | 4/2006 | Howle | G01S 19/071 | 342/357.31 |
| 2006/0149474 A1 | 7/2006 | Needelman et al. | | |
| 2007/0118286 A1 * | 5/2007 | Wang | G01C 21/165 | 342/357.59 |
| 2008/0269965 A1 * | 10/2008 | Luk-Paszyc | G01C 21/203 | 701/13 |
| 2009/0018762 A1 * | 1/2009 | Sheikh | G01S 5/16 | 701/513 |
| 2009/0177398 A1 * | 7/2009 | Belenkii | G01C 21/165 | 701/500 |
| 2009/0254278 A1 * | 10/2009 | Wang | G01S 19/215 | 701/472 |
| 2011/0004405 A1 * | 1/2011 | Hutchin | G01S 5/163 | 701/513 |
| 2011/0169689 A1 * | 7/2011 | Wang | G01S 19/26 | 342/357.3 |
| 2011/0181465 A1 | 7/2011 | Li et al. | | |
| 2011/0254734 A1 * | 10/2011 | Li | G01S 19/23 | 342/357.77 |
| 2012/0086606 A1 * | 4/2012 | Mathews | G01C 21/165 | 342/461 |
| 2013/0085628 A1 * | 4/2013 | Li | B64G 1/244 | 701/13 |
| 2013/0126678 A1 * | 5/2013 | Romney, Jr. | B64G 1/26 | 244/172.4 |
| 2014/0292569 A1 * | 10/2014 | Wallace | G01S 19/43 | 342/357.42 |
| 2015/0268051 A1 * | 9/2015 | Hindman | G01C 21/025 | 356/614 |
| 2016/0131751 A1 * | 5/2016 | Mathews | G01S 11/10 | 342/461 |
| 2016/0282123 A1 * | 9/2016 | McCroskey | B64G 1/36 | |
| 2016/0358477 A1 * | 12/2016 | Ansari | G06Q 30/0251 | |
| 2017/0046309 A1 * | 2/2017 | Hubauer | G06F 17/18 | |
| 2017/0067990 A1 * | 3/2017 | Reed | G01S 17/50 | |
| 2017/0131096 A1 * | 5/2017 | Karlov | G01C 21/165 | |
| 2017/0365101 A1 * | 12/2017 | Samec | A61B 5/4088 | |
| 2018/0074154 A1 * | 3/2018 | Lane | G01C 21/02 | |
| 2018/0232557 A1 * | 8/2018 | Chang | G06T 7/215 | |
| 2018/0262271 A1 * | 9/2018 | Carlson | G01S 5/163 | |
| 2018/0313651 A1 * | 11/2018 | Laine | G01S 5/16 | |
| 2018/0341003 A1 * | 11/2018 | Jungwirth | G01S 3/7867 | |
| 2018/0372934 A1 * | 12/2018 | Jungwirth | G02B 5/32 | |
| 2019/0235083 A1 * | 8/2019 | Zhang | G01S 7/4808 | |
| 2019/0317220 A1 * | 10/2019 | Kocer | G01S 1/0423 | |
| 2019/0331756 A1 * | 10/2019 | Jungwirth | G01S 3/7867 | |
| 2019/0346271 A1 * | 11/2019 | Zhang | G01S 7/4808 | |
| 2020/0178849 A1 * | 6/2020 | Cheng | A61B 5/1118 | |
| 2020/0256678 A1 * | 8/2020 | Li | G01C 21/165 | |

FOREIGN PATENT DOCUMENTS

| | | | | |
|---|---|---|---|---|
| CN | 103674023 A * | 3/2014 | | G01C 21/025 |
| CN | 108225336 A * | 6/2018 | | G01S 5/0263 |
| CN | 108613674 A * | 10/2018 | | G01S 19/072 |
| WO | WO-02061449 A1 * | 8/2002 | | G01S 19/04 |
| WO | WO-2012048287 A2 * | 4/2012 | | G01S 5/0263 |
| WO | WO-2016116511 A1 * | 7/2016 | | G01C 21/165 |
| WO | WO-2017078835 A1 * | 5/2017 | | G01C 1/08 |

OTHER PUBLICATIONS

Aerospace Report No. ATR-2006 (5200)-1 Space-Based Navigation for RLV's and ELV's (Year: 2006).*
(PDF) Statistical Characterization of GLONASS Broadcast . . . www.researchgate.net>. . . > Geoscience > Glonass Dec. 18, 2014—The ephemeris errors are computed by comparing broadcast ephemerides with precise ones, both of which were obtained from International . . . pp. 9 (Year: 2014).*
Rich Hutchin, Design and manufacture of large aperature wavefront sensor, Proc. SPIE 5553, Advanced Wavefront Control: Methods, Devices, and Applications II, (Oct. 12, 2004).

* cited by examiner

CELESTIAL NAVIGATION SYSTEM AND METHOD

INTRODUCTION

The present disclosure relates to systems and methods for navigating using a plurality of space objects. More particularly, the present disclosure relates to a system and method for providing celestial navigation to vehicles traveling in the presence of clouds in the sky.

BACKGROUND

Celestial navigation uses the angular measurements of heavenly bodies (e.g. stars, sun, moon, planets, satellites or resident space objects (RSOs), etc.) to determine attitude, position and time. Celestial navigation has been extensively used for marine navigation as well as the navigation of aircraft and missiles. When the Global Positioning System (GPS) became fully operational and available as a low cost, high accuracy, and high availability navigation method celestial navigation was in low demand for some time. However, there has been a strong renewed interest in celestial navigation because GPS includes some drawbacks such as limited availability and vulnerability due to jamming and spoofing.

An optical sensor-based approach has been the primary approach to determine spacecraft attitude. Early spacecraft used sun sensors and earth sensors for attitude determination. However, star-tracker based systems are now the approach of choice for most spacecraft due to the high accuracy and the availability of relatively low-cost star-trackers.

Although celestial navigation offers the promise of a GPS independent navigation solution, there are several problems that should be solved in order to provide an operationally feasible solution. Clouds present one of the biggest challenges to celestial navigation. Fortunately, the probability to see clouds becomes much lower at high altitude. In fact, most of the military aircraft and the commercial jet liners fly at altitudes where there is very little cloud coverage.

However, with respect to marine navigation and ground navigation, there is a 50% probability of seeing a clear sky at ground level. Consequently, low altitude celestial navigation should consider the impact of clouds on the availability of space object measurements.

Measurements of RSOs provide observability for both attitude and position and has the potential to greatly improve the accuracy of a celestial navigation system design. Therefore, there is a need in the art to provide a system and method to navigate a vehicle, in the air or on the ground or on the water, that is able to take RSO measurements in the presence of clouds.

SUMMARY

According to several aspects of the present disclosure a celestial navigation system for determining a position of a vehicle using a plurality of space objects is provided. The system includes a star-tracker, a beam director, an inertial measurement unit, and a control module.

The star-tracker has a field of view for capturing light. The beam director is configured to change a direction of the light captured in the field of view of the star-tracker. The inertial measurement unit has a plurality of sensors for measuring an acceleration and a rotation rate of the vehicle. The control module is in electronic communication with the star-tracker, the beam director and the inertial measurement unit.

The control module executes instructions to determine a magnitude and a position of a first plurality of the plurality of space objects in the field of view of the star-tracker. Additionally, instructions are executed to change the direction of the light captured in the field of view of the star-tracker. Further, instructions are executed to determine a magnitude and a position of a second plurality of the plurality of space objects in the field of view of the star-tracker. Moreover, instructions are executed to determine an attitude, a velocity, and a position of the vehicle based on the measured rotation rate and measured acceleration of the vehicle. Furthermore, instructions are executed to correct the attitude, the velocity and the position of the vehicle using the determined magnitude and position of the first and second plurality of the plurality of space objects.

In accordance with still another aspect of the present disclosure, a method for determining a position of a vehicle using a plurality of space objects is provided. The method includes capturing light in a field of view of a star-tracker emanating from the plurality of space objects. The method further includes measuring an acceleration and a rotation rate of the vehicle using an inertial measurement unit having a plurality of sensors. Additionally, the method includes generating a cloud map to determine a position in the sky of a plurality of clouds. The method further includes determining a position in the sky of at least one of the plurality of space objects, not blocked by the clouds, based on the cloud map. Additionally, the method includes changing the direction of the light captured in the field of view of the star-tracker using a beam director to capture the light emanating from the at least one of the plurality of space objects at the position in the sky of the at least one of the plurality of space objects. The method further includes determining a magnitude and a position of the at least one of the plurality of space objects in the field of view of the star-tracker. Additionally, the method includes determining an attitude, a velocity, and a position of the vehicle based on the measured rotation rate and measured acceleration of the vehicle. The method further includes correcting the attitude, the velocity and the position of the vehicle using the magnitude and the position in the field of view of the star-tracker of the at least one of the plurality of space objects.

In accordance with still another aspect of the present disclosure, a method for determining a position of a vehicle using a plurality of space objects is provided. The method includes capturing light in a field of view of a star-tracker emanating from the plurality of space objects. The method further includes measuring an acceleration and a rotation rate of the vehicle using an inertial measurement unit having a plurality of sensors. Additionally, the method includes generating a cloud map to determine a position in the sky of a plurality of clouds. The method further includes determining a position in the sky of at least one resident space object, not blocked by clouds, of the plurality of space objects based on the cloud map. Additionally, the method includes changing the direction of the light captured in the field of view of the star-tracker using a beam director to capture light emanating from the at least one resident space object at the position in the sky of the at least one resident space object. The method further includes determining a magnitude and a position of the at least one resident space object in the field of view of the star-tracker. Additionally, the method includes determining an attitude, a velocity, and a position of the vehicle based on the measured rotation rate and measured acceleration of the vehicle. The method further includes correcting the attitude, the velocity and the position of the vehicle using the magnitude and the position of the at least one resident space object in the field of view of the star-tracker.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to a system and method for locating a vehicle based on celestial navigation. The vehicle may be travelling over land, sea, in the air or in space. As will be described in greater detail below, a plurality of space objects, for example, stars, sun, moon, planets, satellites, resident space object (RSOs), etc. having known positions are used as references to make corrections to the determined position of the vehicle.

Figure 1:
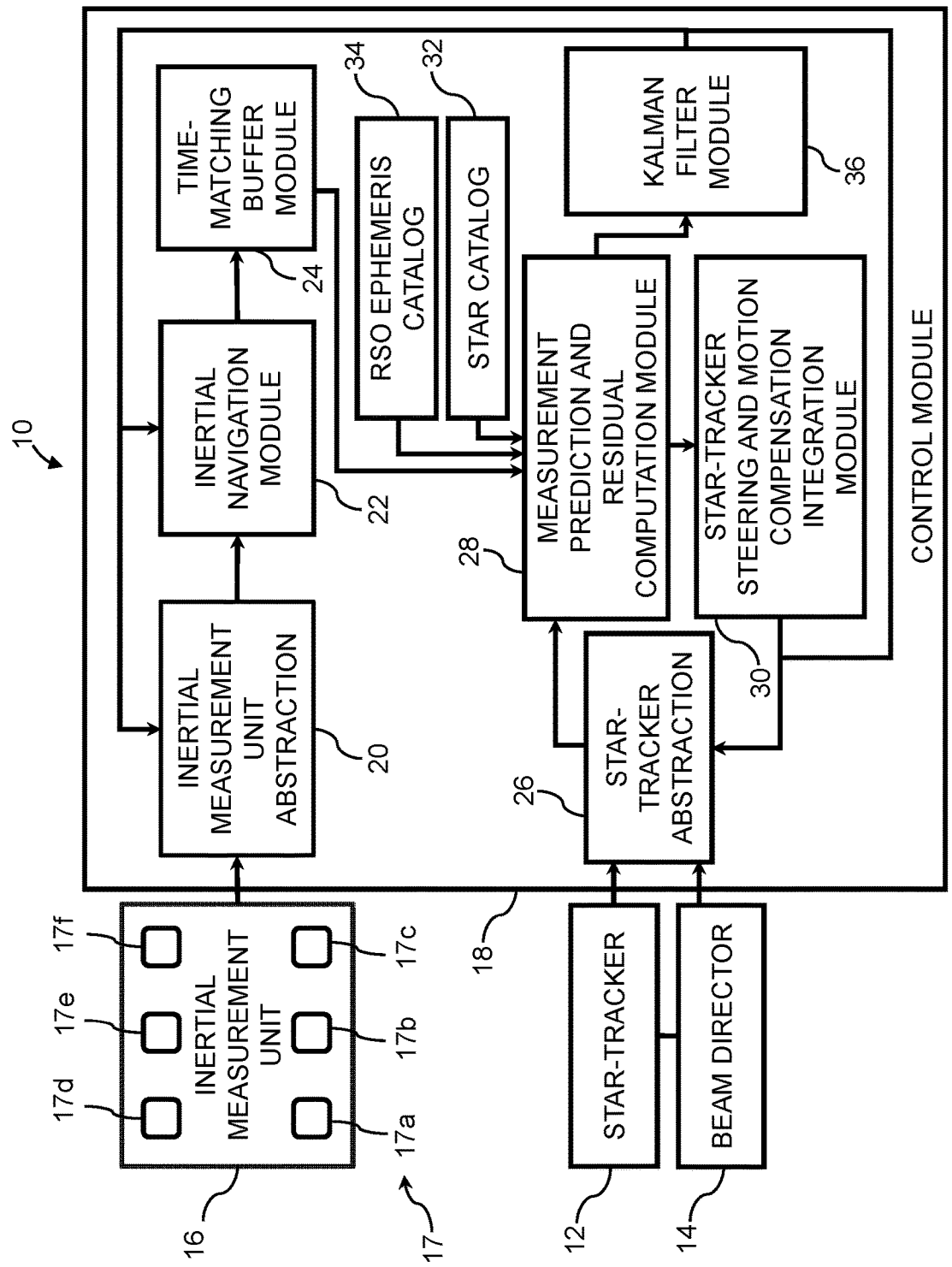
FIG. 1 is a system architecture diagram of a celestial navigation system configured to determine a position of a vehicle using a plurality of space objects, according to an exemplary embodiment.

Referring now to FIG. 1, a system architecture diagram illustrates a celestial navigation system 10, in accordance with the present disclosure. Celestial navigation system 10 is configured to determine a position of a vehicle in an earth reference frame, for example, an earth center earth fixed (ECEF) reference frame. System 10 includes a star-tracker 12, a beam director 14, an inertial measurement unit (IMU) 16, and a control module 18. The star-tracker 12 has a field of view (FOV) for capturing light generated or reflected from the plurality of space objects. The star-tracker 12 provides the position of the plurality of space objects in the FOV. Additionally, star-tracker 12 provides magnitude measurements for the plurality of space objects for a given moment in time and thus, associates a time tag with the measurements. If a resident space object (RSO) is in the FOV of the star-tracker 12, star-tracker 12 is configured to provide the position and magnitude of the RSO. A time-tag is also associated with the RSO measurements of position and magnitude. RSOs are not prevalent in the sky thus, typically one RSO may be located in the FOV at a given time.

The beam director 14 provides two-degrees of freedom control of star-tracker 12 in the FOV direction. In an aspect of the present disclosure, the beam director 14 uses a two one-axis gimbals to move a portion the optical system, specifically, two mirrors. The focal plane array and the electronics of the star-tracker 12 do not move. Advantageously, the portion the optical system of the star-tracker 12 that moves has a much lower mass as compared to conventional gimbaled star-tracker systems.

The inertial measurement unit 16 includes a plurality of sensors 17 for measuring an acceleration and a rotation rate of the vehicle. The plurality of sensors 17 of inertial measurement unit 16 includes three navigation grade accelerometers 17a, 17b, and 17c and three tactical grade gyroscopes 17d, 17e, and 17f to provide rotation rate (or delta angle) and acceleration (or delta velocity) measurements of the vehicle. Navigation grade accelerometers 17a, 17b, and 17c and tactical grade gyroscopes 17d, 17e, and 17f achieve the necessary position and velocity performance. The combination of navigation grade accelerometers and tactical grade gyros is a compromise between the necessary performance and cost.

The control module 18 is in electronic communication with the star-tracker 12, the beam director 14 and the inertial measurement unit 16. The control module 18 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory (not shown). Memory includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. Moreover, the control module 18 includes software modules that have executable code for carrying out the functions and processes, as described herein below. For example, the control module 18 includes an IMU abstraction 20, an inertial navigation module 22, a time-matching buffer module 24, a star-tracker abstraction 26, a measurement prediction and residual computation module 28, a star-tracker steering and motion compensated integration module 30, and a Kalman filter module 36.

The IMU abstraction 20 processes and decodes the vehicle's rotation rate (or delta angle) and acceleration (or delta velocity) measurements received from the IMU 16. The output of the IMU abstraction 20 is processed by an inertial navigation module 22. The inertial navigation module 22 includes executable code to integrate the rotation rate of the vehicle into the attitude of the vehicle with consideration of the earth's rotation. The vehicle attitude is then used to project vehicle acceleration on to the ECEF reference frame. Accordingly, total vehicle acceleration, including gravity, due to earth rotation may be calculated. Vehicle acceleration is then integrated into the velocity of the vehicle and vehicle velocity is integrated to determine the position of the vehicle in the ECEF reference frame.

A time-matching buffer module 24 includes executable code to save the position, velocity, attitude of the vehicle into a first-in-first-out (FIFO) buffer or a circular buffer with a time-tag. The time-matching buffer module 24 provides the time-matched position, velocity, and attitude of the vehicle when a time-tag of the star or RSO measurements are provided. The time-matched position, velocity, and attitude of the vehicle are provided to the measurement prediction and residual computation module 28.

Star-tracker abstraction 26 preforms two groups of processing, namely a receiving process and a sending process. The receiving process includes executable code to decode the data received from star-tracker 12 and applies corrections and transformations, as described below. Additionally, a time-tag is established based on the system time of the measurements. The time-tag is derived from the star-tracker 12 provided time-tag in the star-tracker time reference. As outputs, the star-tracker abstraction 26 provides the corrected or transformed star or RSO position and magnitude measurements together with a time-tag to the measurement prediction and residual computation module 28. The measurement prediction and residual computation module 28 is in communication with the star-tracker steering and motion compensated integration module 30. When the star-tracker 12 is operating in directed FOV mode or motion compensated integration (MCI) mode, the sending process of the star-tracker abstraction 26 includes executable code to receive data corresponding to the predicted stars and RSOs in the FOV of the star-tracker 12 from the star-tracker steering and motion compensated integration module 30. The predicted position and expected magnitude of the stars and RSOs in the FOV of the star-tracker 12 are also calculated by the star-tracker steering and motion compensated integration module 30. The predicted position and expected magnitude are then transmitted to the beam director 14 to allow the star-tracker 12 to find stars and RSOs in a small directed FOV window in the FOV.

The measurement prediction and residual computation module 28, matches or identifies the stars and RSOs against a star catalog 32 and RSO ephemeris catalog 34 data. Moreover, measurement prediction and residual computation module 28 calculates the difference between the predicted position of the star or RSO and the measured position of the star or RSO to generate residuals as well as a measurement sensitivity matrix or H-matrix for use in the Kalman filter module 36. The measurement prediction and residual computation module 28 predicts the stars and RSO positions in the FOV to support directed FOV operation of the star-tracker 12 as well as MCI when such data is provided at high rate to the star-tracker 12.

The star-tracker steering and motion compensated integration module 30 steers the beam director 14 to change the light entering the FOV of the star-tracker 12 to avoid clouds and to locate an RSO. The star-tracker steering and motion compensated integration module 30 compensates for the motion of the vehicle to sustain the cloud avoidance and RSO tracking. A cloud map of a portion of the sky is generated by the star-tracker 12. Cloud analysis software provided in star-tracker steering and motion compensated integration module 30 processes a full-sky image of the portion of the sky including the clouds captured by the star-tracker 12 and generates the cloud map. The cloud map is a data structure that stores the position of the clouds in the full-sky image of the portion of the sky. The cloud avoidance and satellite tracking support software use the RSO ephemeris catalog 34 data to determine the position of candidate RSOs in the sky. If a cloud is obstructing the view of a selected RSO, a new or candidate RSO is selected. The new RSO is selected based the cloud map. Moreover, selection of the new RSO is also based on an orbit plane diversity of available RSOs. In other words, the selection of an RSO that is in a different orbit from a previously selected RSO is preferred and will be selected over an RSO that exists in the same or similar orbit. The direction of the newly selected RSO in the star-tracker 12 reference frame is calculated and the gimbal angles to direct the beam director 14 are calculated. A beam director control logic provided in star-tracker steering and motion compensated integration module 30 handles the low-level control of the beam director 14 to point to the direction of the selected or predicted position in the sky of the RSO.

The Kalman filter module 36 uses a residual and H matrix received from the measurement prediction and residual computation module 28 to generate corrections to the position, velocity and attitude of the vehicle produced by the inertial navigation module 22. Additionally, corrections of the IMU error parameters, corrections for the star-tracker 12 alignment parameters and RSO ephemeris errors are also determined, as will be described in greater detail below.

Figure 2:
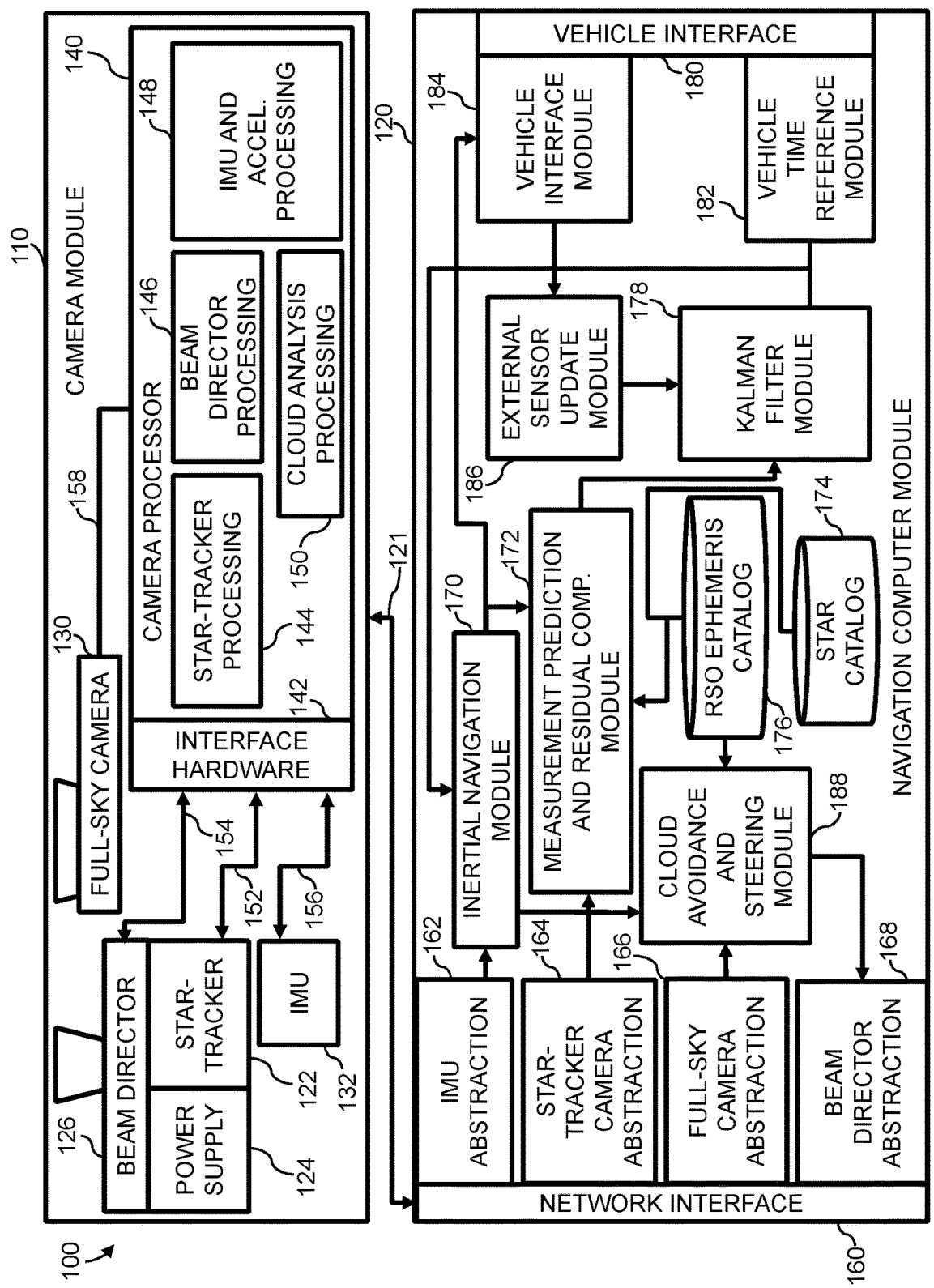
FIG. 2 is a system diagram of a celestial navigation system for low altitude vehicles, according to an exemplary embodiment.

Referring now to FIG. 2, another aspect of the present disclosure is illustrated and referenced as a celestial navigation system 100. The celestial navigation system 100 is a celestial navigation system for vehicles travelling in the presence of clouds. The celestial navigation system 100 includes a camera module 110 and a navigation computer module 120. The camera module 110 and navigation computer module 120 are in electronic communication with one another through a wired communication link 121, such as a gigabit ethernet link or, alternatively, a wireless link.

The camera module 110 includes a star-tracker 122. Star-tracker 122 is a short-wave infrared camera capable of receiving light from a space object. A power supply 124 is in electrical communication with the star-tracker 122 and provides electrical power to operate the star-tracker 122. A beam director 126 captures and directs light into star-tracker 122. Moreover, the camera module 110 includes a full-sky camera 130. The full-sky camera 130 is configured to capture a full-sky image of a large area of the sky. An inertial measurement unit 132 is an inertial measurement unit that is disposed locally with the star-tracker 122.

A camera processor 140 includes an interface hardware 142. The interface hardware 142 is in communication with a star-tracker processing 144, a beam director processing 146, an IMU and accelerometer processing 148, and a cloud analysis processing 150.

The interface hardware 142 receives data from the star-tracker 122 via a data link 152. In an embodiment of the present disclosure, the data link 152 is a camera link and an RS-422 link, or the like. Data and control signals are communicated to beam director 126 from the camera processor 140 and interface hardware 142 through a beam director data link 154. In an embodiment of the present disclosure, the beam director data link 154 is a beam director encoder interface and magnetic drive control link, or the like. A high-speed data transmission link 156, such as an RS-422 data line, connects the IMU 132 to interface hardware 142. The full-sky camera 130 communicates image data to the camera processor 140 through a full-sky camera link 158.

The navigation computer module 120 includes a network interface 160, such as a gigabit ethernet interface or the like. The network interface 160 sends and receives data from the wired communication link 121 and passes the data to and from an IMU abstraction 162, star-tracker camera abstraction 164, a full-sky camera abstraction 166 and a beam director abstraction 168.

The IMU 132 includes accelerometers and gyroscopes to measure acceleration and rotation of the vehicle. The measured acceleration and rotation are transferred through interface hardware 142 to the IMU and accelerometer processing 148. The IMU and accelerometer processing 148 processes and decodes the rotation rate (or delta angle) and acceleration (or delta velocity) measurements of the vehicle from the IMU 132. The output of IMU and accelerometer processing 148 is processed by the IMU abstraction 162. The IMU abstraction 162 provides the rotation rate and acceleration of the vehicle to the inertial navigation module 170. The inertial navigation module 170 includes executable code to integrate the rotation rate of the vehicle into vehicle attitude with consideration of earth rotation. The vehicle attitude is then used to project vehicle acceleration on to the ECEF reference frame. Accordingly, total vehicle acceleration, including gravity, Coriolis and centrifugal acceleration terms due to earth rotation may be calculated. Vehicle acceleration is then integrated into vehicle velocity and vehicle velocity is integrated to determine vehicle position. The inertial navigation module 170 further includes a time-matching buffer. The time-matching buffer of the inertial navigation module 170 includes executable code to save the position, velocity, attitude of the vehicle into a first-in-first-out (FIFO) buffer or a circular buffer with a time-tag. The time-matching buffer provides the time-matched position, velocity, and attitude of the vehicle with a time-tag to a measurement prediction and residual computation module 172.

The star-tracker processing 144 is in communication with the star-tracker 122 to provide the position and magnitude measurements of a star or a plurality of stars in the FOV to the star-tracker processing 144 via interface hardware 142. If an RSO is in the FOV of the star-tracker 122, star-tracker 122 is configured to provide the position and magnitude measurements of the RSO. A time-tag is also associated with the star and RSO measurements of position and magnitude.

Beam director processing 146 includes control software to change the direction of light beams entering the star-tracker 122. The beam director processing 146 handles the low-level control of the beam director 126 to point to the direction of the selected or predicted position of a star or an RSO. The control logic of the beam director processing 146 provides the gimbal angle measurements to the rest of the navigation computer module 120 and sends the commanded gimbal angles to the beam director 126.

The star-tracker camera abstraction 164 preforms two groups of processing, a receiving process and a sending process. The receiving process includes executable code to decode the data received from star-tracker processing 144 and applies known corrections and transformations. Additionally, a time-tag is established based on the system time of the star or RSO measurements. The time-tag is derived from the star-tracker provided time-tag in the star-tracker time reference. As outputs, the star-tracker camera abstraction 164 provides the corrected or transformed star or RSO position and magnitude data together with a time-tag to the measurement prediction and residual computation module 172. The measurement prediction and residual computation module 172, matches or identifies the stars and RSOs against a star catalog 174 and an RSO ephemeris catalog 176. The star catalog 174 includes star data for use in identifying stars and the RSO ephemeris catalog 176 includes RSO ephemeris data for use in identifying RSOs. Moreover, the measurement prediction and residual computation module 172 calculates the difference between the predicted position and the measured position of the stars and RSOs to generate residuals as well as a measurement sensitivity matrix or H-matrix for processing by a Kalman filter module 178. The measurement prediction and residual computation module 172 predicts the stars and RSO positions in the FOV to support directed FOV operation of the star-tracker 122 as well as MCI.

The Kalman filter module 178 uses the residuals and H-matrix received from the measurement prediction and residual computation module 172 to generate corrections for use by the inertial navigation module 170. Additionally, corrections are also generated for the IMU 132 error parameters, star-tracker 122 alignment parameters and the RSO ephemeris errors. In accordance with the present disclosure, the Kalman filter of Kalman filter module 178 contains the following states: (a) inertial navigation states: vehicle position error, vehicle velocity error and vehicle attitude error (nine states); (b) IMU error parameter states: there could be many IMU error parameters states. For example, for a six-state model there are three gyroscope bias states and three accelerometer bias states. However, for a twenty-one-state model there are three gyroscope bias states, three gyroscope scale factor states, three gyroscope rotational misalignment states, three gyroscope non-orthogonality error states, three accelerometer bias states, three accelerometer scale factor states, and three accelerometer non-orthogonality error states. Scale factor asymmetry states and G sensitivity states may also be included: (c) four beam director misalignment states; and (d) three RSO ephemeris error states. IMU error parameters states are each modelled as a random walk or a 1st order Markov process, beam director misalignments states are each modelled as a random walk or a 1st order Markov process, ephemeris error states are modeled as constant random variable which gets reset each time a new RSO is selected.

A vehicle interface 180 interconnects navigation computer module 120 with the other vehicle sensors and hardware (no shown). A vehicle time reference module 182 provides a vehicle reference time to navigation computer module 120. A vehicle interface module 184 provides a software interface to pass data (i.e. sensor data) between the navigation computer module 120 and the vehicle. An external sensor update module 186 receives the sensor data signals from vehicle interface module 184 and processes the sensor signals and forwards the sensor data signals to the Kalman filter module 178.

The full-sky camera abstraction 166 in communication with the cloud analysis processing 150 provides a cloud map of a portion of the sky. The cloud analysis processing 150 processes the full-sky image captured by the full-sky camera 130 and generates the cloud map. The cloud map is a data structure that stores the position of the clouds in the full-sky image of the portion of the sky. The beam director abstraction 168 provides the gimbal angle measurements to change the direction of the light entering the star-tracker 122 to capture light emanating from a star or RSO not obstructed by a cloud. The beam director abstraction 168 sends the commanded gimbal angle to the beam director processing 146.

The cloud avoidance and steering module 188 uses the RSO ephemeris catalog 176 to determine candidate RSOs. If a new RSO is needed because the current RSO is obstructed by clouds, a candidate RSO is selected based on the cloud map. Moreover, the cloud avoidance and steering module 188 selects the candidate RSO based on orbit plane diversity. The direction in the star-tracker 122 reference frame and the beam director 126 gimbal angles are calculated. The beam director processing 146 handles the low-level control of the beam director 126, i.e. controls the beam director 126 to point to the direction as commanded to the selected RSO that is not obstructed by a cloud.

The residuals and H-matrix determined in measurement prediction and residual computation module 172 will now be described. The residuals used by the Kalman filter module 178 are calculated as the difference between the actual measurement derived from star-tracker 122 and the predicted measurement using the current estimate of states. Firstly, a line-of-sight (LOS) unit vector from the vehicle to be located to the star or RSO, designated as reference point j, is described by Equation 1 as:

$$^E u_j = \frac{1}{\|^E r_j - ^E r\|}(^E r_j - ^E r) = \frac{1}{\rho_j}(^E r_j - ^E r) \quad \text{Equation 1}$$

where $^E r$ is the position of the vehicle in the ECEF refernce frame, $\rho_j = \|^E r_j - ^E r\|$ is the range to the reference point j, and $^E r_j$ is the ECEF frame position vector for reference point j. $^E u_j$ is transformed to the star-tracker 122 reference frame using Equation 2:

$$^c u_j = C_B{}^C C_E{}^B {}^E u_j \quad \text{Equation 2}$$

where $C_B{}^C$ is the directional cosine matrix (DCM) from vehicle frame to star-tracker 122 frame and represents star-tracker 122 orientation and where $C_E{}^B$ is the DCM from the ECEF reference frame to vehicle frame and represents vehicle attitude. To predict star and RSO position in the FOV of the star-tracker 122 the unit vector $^c u$ in the FOV is transformation to h and v coordinate axis in the FOV, where h is the horizontal coordinate of the star or RSO in the FOV and v is the vertical coordinate of the star or RSO in the FOV. The horizontal coordinate h of the star or RSO in the FOV is calculated according to Equation 3:

$$h_j = \frac{^c u_j(1)}{^c u_j(3)} \quad \text{Equation 3}$$

The vertical coordinate v of the star or RSO in the FOV is calculated according to Equation 4:

$$v_j = \frac{^c u_j(2)}{^c u_j(3)} \quad \text{Equation 4}$$

Accordingly, the Kalman filter residuals are described by Equations 5 and 6:

$$\Delta h_j = mh_j - h_j \quad \text{Equation 5}$$

$$\Delta v_j = mv_j - v_j \quad \text{Equation 6}$$

where $mh_j$ and $mv_j$ are the measured coordinates in the star-tracker 122 FOV as the output of the star-tracker 122 for a star or an RSO.

H sub-matrices for star-tracker 122 misalignment, vehicle attitude, vehicle position, and star or RSO reference position errors used in Kalman filter module 178 are as follows.

The H sub-matrix for star-tracker 122 misalignment (cma) error is expressed as Equation 7:

$$H_{cma} = \frac{1}{^c u(3)}\begin{bmatrix} 1 & 0 & -h \\ 0 & 1 & -v \end{bmatrix}[^c \hat{u}_j \times] = \frac{1}{^c u(3)}\begin{bmatrix} 1 & 0 & -h \\ 0 & 1 & -v \end{bmatrix} \quad \text{Equation 7}$$

$$\begin{bmatrix} 0 & -^c u_j(3) & ^c u_j(2) \\ ^c u_j(3) & 0 & -^c u_j(1) \\ -^c u_j(2) & ^c u_j(1) & 0 \end{bmatrix} = \begin{bmatrix} 1 & 0 & -h \\ 0 & 1 & -v \end{bmatrix}$$

$$\begin{bmatrix} 0 & -1 & v \\ 1 & 0 & -h \\ -v & h & 0 \end{bmatrix} = \begin{bmatrix} hv & -(1+h^2) & v \\ 1+v^2 & -hv & -h \end{bmatrix}.$$

The H sub-matrix for vehicle attitude error is expressed as Equation 8:

$$H_{att} = \frac{-1}{^c u(3)}\begin{bmatrix} 1 & 0 & -h \\ 0 & 1 & -v \end{bmatrix}[^c \hat{u}_j \times]\hat{C}_E^C = \quad \text{Equation 8}$$

$$-\begin{bmatrix} hv & -(1+h^2) & v \\ 1+v^2 & -hv & -h \end{bmatrix}\hat{C}_E^C.$$

The H sub-matrix for vehicle position error is expressed as Equation 9:

$$H_{pos} = \quad \text{Equation 9}$$

$$\frac{-1}{^c u(3)}\begin{bmatrix} 1 & 0 & -h \\ 0 & 1 & -v \end{bmatrix}\frac{1}{\hat{\rho}}\hat{C}_B^C \hat{C}_E^B = \frac{-1}{\hat{\rho}\sqrt{1+h^2+v^2}}\begin{bmatrix} 1 & 0 & -h \\ 0 & 1 & -v \end{bmatrix}\hat{C}_E^C.$$

where $\hat{\rho}$ is the range to the reference point j: $\rho_j = \|^E r_j - ^E r\|$ and $\hat{C}_E^C$ is the direction cosine matrix from the ECEF reference frame to the star-tracker 122 camera body frame. The H sub-matrix for star or RSO reference point position error is expressed as Equation 10:

$$H_{rpp} = \frac{1}{^c u(3)}\begin{bmatrix} 1 & 0 & -h \\ 0 & 1 & -v \end{bmatrix}\frac{1}{\hat{\rho}}\hat{C}_B^C \hat{C}_E^B = \quad \text{Equation 10}$$

$$\frac{1}{\hat{\rho}\sqrt{1+h^2+v^2}}\begin{bmatrix} 1 & 0 & -h \\ 0 & 1 & -v \end{bmatrix}\hat{C}_E^C.$$

Figure 3:
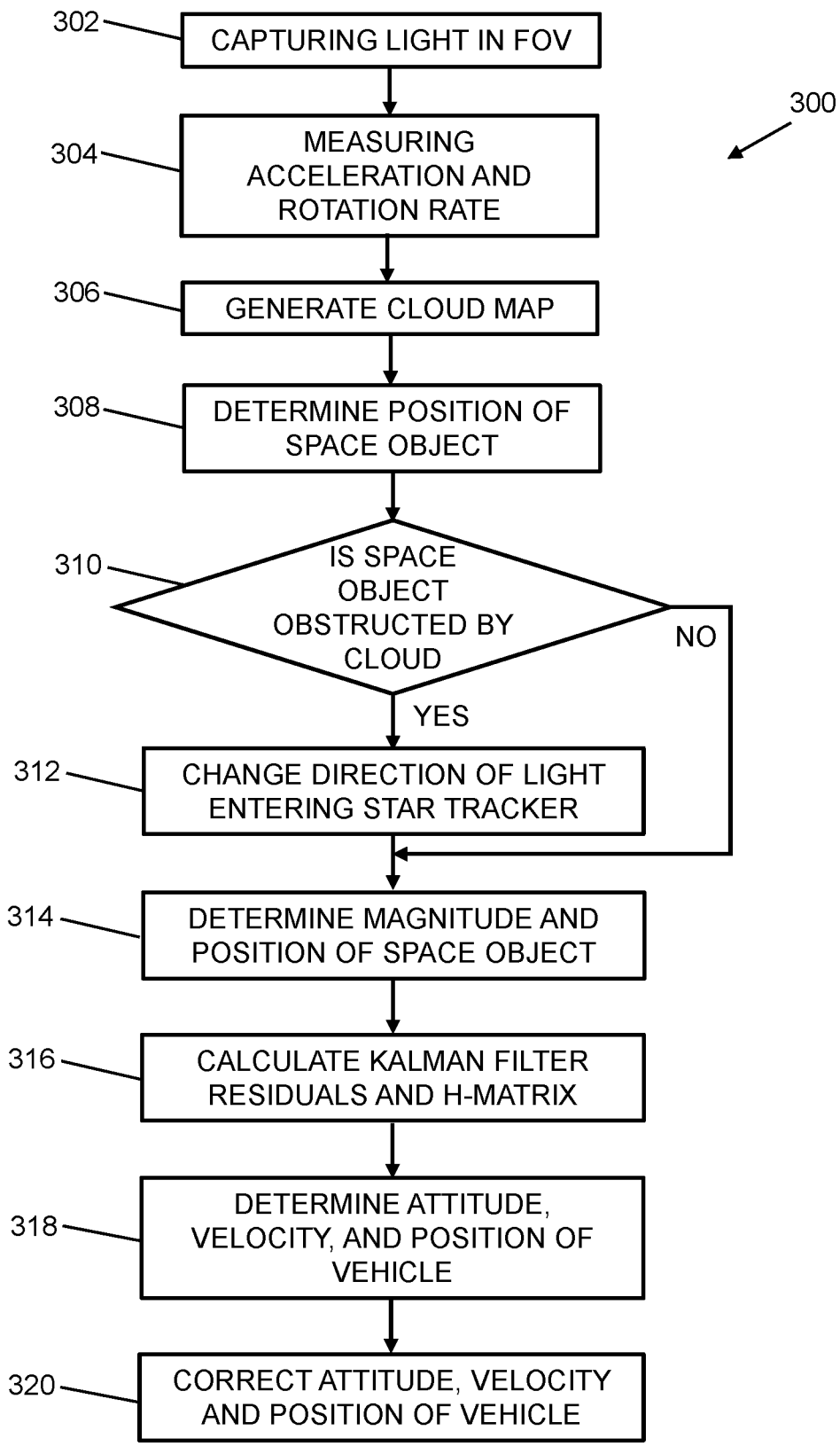
FIG. 3 is a flowchart depicting a method for controlling the celestial navigation system to locate a space object, according to an exemplary embodiment.

Referring now to FIG. 3., a method 300 for controlling the celestial navigation system 100 to locate a space object is illustrated, in accordance with the present disclosure. Method 300 starts at block 302 where light emanating from the plurality of space objects is captured in the field of view of a star-tracker 122. At block 304, an acceleration and a rotation rate of the vehicle is measured using the inertial measurement unit 132. At block 306, a cloud map is generated to determine the position of clouds in the sky. At block 308, the position of a space of object such as a star is determined. A determination is made at block 310 whether the space object is obstructed by clouds. If a determination is made, at block 310, that the space object is obstructed by clouds then at block 312, the beam director 126 is controlled to change the direction of the light entering the star-tracker 122 to avoid the clouds. At block 314, determination of magnitude and position are performed for the space object in the FOV of the star-tracker. Kalman filter residuals and Kalman filter H-matrices are calculated at block 316. At block 318, an attitude, a velocity, and a position of the vehicle based on the measured rotation rate and measured acceleration of the vehicle is determined. At block 320, corrections to inertial navigation states are generated based on the Kalman Filter residuals and Kalman filter H-matrices to correct the attitude, velocity and position of the vehicle. However, if at block 310 a determination is made that the space object is not obstructed by clouds then the method 300 continues to block 314 where measurements of position and magnitude are determined for the space object.

Figure 4:
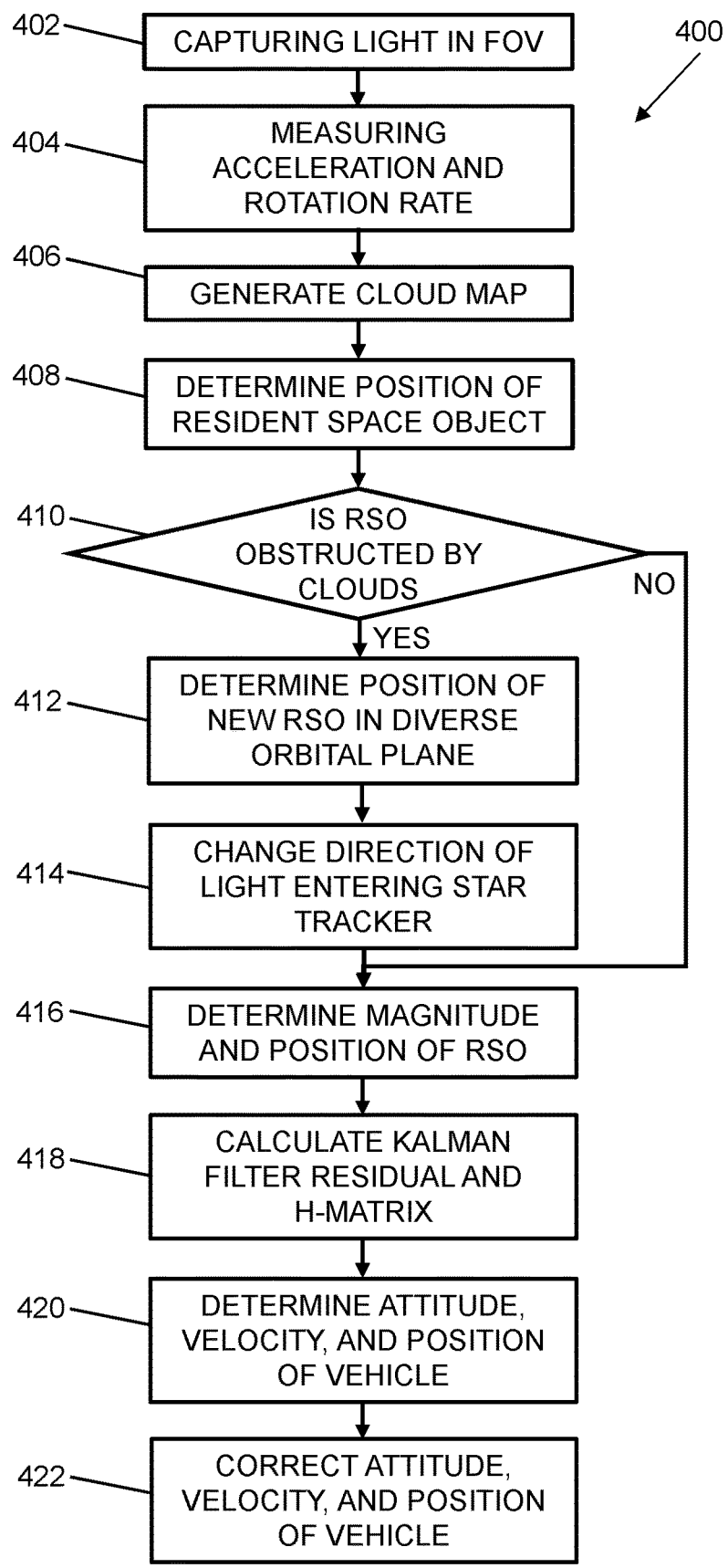
FIG. 4 is a flowchart depicting a method for controlling the celestial navigation system to locate a space object, according to an exemplary embodiment.

Referring now to FIG. 4, a method 400 for controlling the celestial navigation system 100 to locate an RSO is illustrated, in accordance with the present disclosure. Method 400 starts at block 402 where light emanating from the plurality of space objects is captured in the field of view of a star-tracker 122. At block 404, an acceleration and a rotation rate of the vehicle is measured using the inertial measurement unit 132. A cloud map is generated at block 406 to determine the position of clouds in the sky. At block 408, the position of an RSO is determined. A determination is made at block 410 whether the RSO is obstructed by clouds. If a determination is made that the RSO is obstructed by clouds then at block 412, the method determines the position of a new RSO in a diverse plane of orbit than a previously measured RSO or other space object. The beam director 126 is controlled to change the direction of the light entering the star-tracker 122 to avoid the clouds, at block 414. At block 416, measurements of position and magnitude are performed for the new RSO. Kalman filter residuals and Kalman filter H-matrices are calculated at block 418. At block 420, an attitude, a velocity, and a position of the vehicle based on the measured rotation rate and measured acceleration of the vehicle is determined. At block 422, corrections to inertial navigation states are generated based on the Kalman filter residuals and Kalman filter H-matrices to correct the attitude, velocity and position of the vehicle. However, if a determination is made, at block 410, that the RSO is not obstructed by clouds then the method 400 continues to block 416 where measurements of magnitude and position are performed for the RSO.

The present disclosure has many advantages and benefits over the prior art. For example, the system and method of the present disclosure is configured to provide celestial navigation to low altitude vehicles in the presence of clouds. Moreover, the system and method are capable of finding stars that are not obstructed by clouds. Additionally, RSOs that are not obstructed by clouds are also located by the system and method of the present disclosure. The unobstructed stars and RSOs are used by the system and method of the present disclosure to correct the position, velocity and attitude measurements of the vehicle. Beneficially, the ability of the system and method to locate RSOs provides a more accurate vehicle position, velocity and attitude determination over conventional celestial navigation systems.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A celestial navigation system for determining a position of a vehicle using a plurality of space objects, the system comprising:
   a star-tracker having a field of view for capturing light;
   a beam director configured to change a direction of the light captured in the field of view of the star-tracker;
   an inertial measurement unit having a plurality of sensors for measuring an acceleration and a rotation rate of the vehicle;
   a control module in electronic communication with the star-tracker, the beam director and the inertial measurement unit, the control module executing instructions to:
   determine a magnitude and a position of a first plurality of the plurality of space objects in the field of view of the star-tracker;
   change the direction of the light captured in the field of view of the star-tracker;
   determine a magnitude and a position of a second plurality of the plurality of space objects in the field of view of the star-tracker;
   determine an attitude, a velocity, and a position of the vehicle based on the measured rotation rate and the measured acceleration of the vehicle; and
   correct the attitude, the velocity and the position of the vehicle using the magnitude and the position of the first and second plurality of the plurality of space objects in the field of view of the star-tracker and a Kalman filter having a plurality of states, wherein at least three of the states are resident space object ephemeris error states and wherein the at least three resident space object ephemeris error states are used to model a position error of the first and second plurality of the plurality of space objects.

2. The celestial navigation system of claim 1, wherein the control module executing instructions further comprises executing instructions to determine a position in the sky of a resident space object using a resident space object ephemeris catalog.

3. The celestial navigation system of claim 2, wherein the control module executing instructions further comprises executing instructions to change the direction of the light entering the star-tracker using the beam director based on the determined position in the sky of the resident space object.

4. The celestial navigation system of claim 3, wherein the control module executing instructions further comprises executing instructions to determine the position of the vehicle based at least on the determined position in the sky of the resident space object and the determined attitude and the measured acceleration of the vehicle.

5. The celestial navigation system of claim 3, wherein the control module executing instructions further comprises executing instructions to generate a cloud map to determine a position of a plurality of clouds.

6. The celestial navigation system of claim 5, further comprising a full-sky camera for capturing a full-sky image of the sky.

7. The celestial navigation system of claim 6, wherein the control module executing instructions further comprises executing instructions to generate the cloud map to determine the position of the plurality of clouds in the sky using the full-sky image of the sky captured by the full-sky camera.

8. The celestial navigation system of claim 7, wherein the instructions to determine the position in the sky of the resident space object further comprises instructions to determine if the resident space object is obstructed by the plurality of clouds using the cloud map.

9. The celestial navigation system of claim 8, wherein the instructions to determine position in the sky of resident space object further comprises instructions to select the resident space object based on the cloud map and an orbit plane diversity.

10. The celestial navigation system of claim 1, wherein the instructions to correct the attitude, the velocity and the position of the vehicle further comprises instructions to generate a Kalman filter residual and a Kalman filter H-matrix based on at least one of a star measurement and a resident space object measurement.

11. The celestial navigation system of claim 1, wherein the inertial measurement unit includes at least three navigation grade accelerometers and at least three tactical grade gyroscopes.

12. The celestial navigation system of claim 1, wherein the instructions to determine the position of the vehicle further comprises instructions to save the position, the velocity and the attitude of the vehicle in a time matching buffer.

13. A method for determining a position of a vehicle using a plurality of space objects, the method comprising:
- capturing light in a field of view of a star-tracker emanating from the plurality of space objects;
- measuring an acceleration and a rotation rate of the vehicle using an inertial measurement unit having a plurality of sensors;
- generating a cloud map to determine a position of a plurality of clouds;
- determining a position in the sky of at least one of the plurality of space objects based on the cloud map;
- changing a direction of the light captured in the field of view of the star-tracker using a beam director to capture light emanating from the at least one of the plurality of space objects at the position of the at least one of the plurality of space objects;
- determining a magnitude and a position of the at least one of the plurality of space objects in the field of view of the star-tracker;
- determining an attitude, a velocity, and a position of the vehicle based on the measured rotation rate and measured acceleration of the vehicle; and
- correcting the attitude, the velocity and the position of the vehicle using the determined magnitude and position of the at least one of the plurality of space objects in the field of view of the star-tracker and a Kalman filter having a plurality of states, wherein at least three of the states are resident space object ephemeris error states and wherein the at least three resident space object ephemeris error states are used to model a position error of the at least one of the plurality of space objects.

14. The method of claim 13, wherein determining a position in the sky of at least one of the plurality of space objects further comprises determining a position of a resident space object using resident space object ephemeris catalog.

15. The method of claim 14, wherein changing the direction of the light entering the star-tracker using the beam director further comprises changing the direction of the light based on the position the resident space object.

16. The method of claim 15, further comprising determining the position of the vehicle based on the position of at least the resident space object and the attitude and the measured acceleration of the vehicle.

17. The method of claim 16, wherein determining the position of the resident space object further comprises determining if the resident space object is obstructed by the plurality of clouds using the cloud map.

18. The method of claim 17, wherein determining the position of resident space object further comprises determining the position of the resident space object based on the cloud map and an orbit plane diversity.

19. The method of claim 13, wherein correcting the attitude, the velocity and the position of the vehicle further comprises calculating a Kalman filter residual and a Kalman filter H-matrix based on at least one of a star measurement and a resident space object measurement.

20. A method for determining a position of a vehicle using a plurality of space objects, the method comprising:
- capturing light in a field of view of a star-tracker emanating from the plurality of space objects;
- measuring an acceleration and a rotation rate of the vehicle using an inertial measurement unit having a plurality of sensors;
- generating a cloud map to determine the position of a plurality of clouds;
- determining a position in the sky of at least one resident space object of the plurality of space objects based on the cloud map;
- changing a direction of the light captured in the field of view of the star-tracker using a beam director to capture light emanating from the at least one resident space object at the position of the at least one resident space object;
- determining a magnitude and a position of the at least one resident space object in the field of view of the star-tracker;
- determining an attitude, a velocity, and a position of the vehicle based on the measured rotation rate and measured acceleration of the vehicle; and
- correcting the attitude, the velocity and the position of the vehicle using the magnitude and the position of the at least one resident space object in the field of view of the star-tracker and calculating a Kalman filter residual and an H-matrix for use in the Kalman filter, wherein the Kalman filter has a plurality of states, and wherein at least three of the plurality of states are resident space object ephemeris error states and wherein the at least three resident space object ephemeris error states are used to model a position error of the at least one resident of space object.

21. The method of claim 20, wherein determining the position in the sky of at least one of resident space object further comprises determining the at least one resident space object based on the cloud map and an orbit plane diversity.

22. The celestial navigation system of claim 1, wherein the instructions to correct the attitude, the velocity and the position of the vehicle further comprises the Kalman filter having a plurality of inertial navigation states, a plurality of inertial measurement unit error parameter states, a plurality of beam director misalignment states and three resident space object ephemeris error states.

23. The method of claim 13, wherein correcting the attitude, the velocity and the position of the vehicle further comprises the Kalman filter having a plurality of inertial navigation states, a plurality of inertial measurement unit error parameter states, a plurality of beam director misalignment states and three resident space object ephemeris error states.

24. The method of claim 20, wherein correcting the attitude, the velocity and the position of the vehicle further comprises the Kalman filter having a plurality of inertial navigation states, a plurality of inertial measurement unit error parameter states, a plurality of beam director misalignment states and three resident space object ephemeris error states.

* * * * *